Patented Feb. 26, 1935

1,992,532

UNITED STATES PATENT OFFICE 1,992,532

METHOD OF REMOVING DISSOLVED SILICA FROM NATURAL ALKALINE BRINES

Walter A. Kuhnert, Pasadena, Calif.

No Drawing. Application August 21, 1933, Serial No. 686,117

4 Claims. (Cl. 23—40)

This invention relates to the removal of small amounts of dissolved silica from alkaline brines, before or after concentration or other preliminary treatment thereof, particularly from natural alkaline brines such as that obtained from Owens Lake, California. The invention is particularly intended and adapted for the removal of dissolved silica from alkaline brines containing sodium or potassium salts, as a step preliminary to the subsequent treatment of such a brine for the production of soda salts, borax, or potash salts.

Alkaline brines, such as natural brine of the type above mentioned, containing for example sodium or potassium carbonate or hydroxide, borates and the like, have a tendency to dissolve silica, and it is therefore found that many such brines of natural occurrence contain appreciable amounts of silica dissolved therein. The brine obtained from Owens Lake, California, for example, contains approximately the following percentage of salts of sodium and potassium, and dissolved silica:

| | Per cent. |
|---|---|
| $Na_2CO_3$ | 12– 18 |
| $Na_2B_4O_7.10H_2O$ | 5– 9 |
| NaCl | 8– 10 |
| KCl | 3– 6 |
| $Na_2SO_4$ | 2– 4 |
| $SiO_2$ | 0.1– 0.3 |

The presence of the dissolved silica in such brines is often extremely objectionable, since it sometimes interferes with the subsequent treatment or processing of the solutions for recovery of valuable products therefrom, and since it frequently precipitates or separates from the solution along with the material which it is desired to recover therefrom and is therefore present as an impurity in the resulting product.

For example, in the carbonation of such a brine for the purpose of recovering soda therefrom, a portion of this soluble silica is precipitated during the carbonating operation, and the silica so precipitated not only contaminates the soda product, but also occludes other salts in solution in the brine which further contaminate such product. The presence of the gelatinous semi-colloidal silica along with the precipitated soda also prevents thorough washing thereof, either in centrifugals or in filters. In such cases, therefore, it is of considerable advantage to remove from the brine, before carbonation substantially all or any desired portion of the soluble silica content thereof, the proportion of silica so removed being preferably sufficient to substantially eliminate precipitation of silica during the carbonation or other subsequent treatment. The precipitation of silica from brine may also be of advantage precedent to the recovery of borax from such brines. While the present invention is intended particularly for treatment of such brines for the removal of water-soluble silica from solution therein, in order to facilitate subsequent treatment of the brine and for the removal of an alkali metal salt constituent thereof, and to improve the yield and quality of the product obtained from such subsequent treatment, it is to be understood that it is not restricted to such use and may be employed in any case where it is desired to precipitate part or all of the water-soluble silica content of such a brine.

The principal object of the present invention, therefore, is to provide a method whereby dissolved silica can be readily, economically and substantially completely removed from alkaline brines, thus enabling and facilitating the production, by suitable subsequent treatment of such brines, of valuable products such as soda ash, bicarbonate and sesquicarbonate of soda, borax, sodium chloride, sodium sulphate, potassium chloride or potassium sulphate, substantially free from silica as an impurity.

The method of removing dissolved silica from alkaline brines of the type above described, in accordance with the present invention, comprises adding to the brine a suitable quantity of a magnesium compound which is slightly soluble in such brine and which is adapted to react with the dissolved silica and form a substantially insoluble crystalline precipitate of magnesium silicate, and then separating the magnesium silicate from the solution, for example by filtration or by sedimentation.

It is well known that silicates of magnesium, as well as other metals, are substantially insoluble or only very slightly soluble in alkaline solutions, but the precipitation of insoluble silicates by the addition of soluble salts of magnesium or other metals to an alkaline solution containing dissolved silica generally takes place slowly and requires a relatively long period for completion and furthermore the precipitates formed are generally of a colloidal or slimy nature, which renders their separation from the solution extremely difficult and often prohibitive in cost. I have found, however, that by the use of a suitably prepared reagent containing magnesium carbonate, preferably in hydrated condition, and thoroughly agitating the solution in the presence of the added reagent, a substantially complete removal of the dissolved silica may be effected within a relatively short period, with the formation of a crystalline precipitate of magnesium silicate, which may be readily separated from the solution by filtration or sedimentation, without requiring the use of any absorptive agent such as is sometimes found necessary for effecting the separation of insoluble silicates of the colloidal or slimy character above referred to. Therefore, the method herein described is quite advantageous from a practical standpoint, due to the relatively short time required for formation of the insoluble silicate and also to the fact that the silicate so formed is of such character that it may readily be separated from the brine.

Magnesium carbonate, or partially carbonated magnesium hydroxide, (in the form of a mixture of magnesium carbonate, basic magnesium carbonate and/or magnesium hydroxide) may be utilized as a reagent for precipitating dissolved silica according to this invention, but I prefer to use a reagent prepared from dolomite and containing magnesium carbonate in slightly soluble form.

In preparing this preferred type of reagent, the dolomite is first calcined and then converted to a finely divided hydrated state, for example by slaking with water or by grinding the same to a finely divided condition and then mixing the same with water. The mixture of hydrated lime and magnesia is then at least partially carbonated by contact with flue gas containing carbon dioxide, or by addition of bicarbonate of soda, or by means of carbon dioxide introduced from any suitable source, until it has combined with enough carbon dioxide to convert all of the calcium into calcium carbonate and to convert about half or more of the magnesium into magnesium carbonate. The reagent thus prepared, comprising a hydrated mixture of magnesium carbonate, basic magnesium carbonate, and/or magnesium hydroxide, and calcium carbonate, is then added to an alkaline brine containing dissolved silica, at a temperature between 32° F. and 212° F., and the brine is agitated for a sufficient period to provide thorough distribution of the reagent throughout the brine, after which the brine may be further agitated or allowed to stand, the total duration of the treatment being sufficient to permit substantially complete reaction of the dissolved silica with the magnesium and formation of a crystalline precipitate containing magnesium silicate. The brine may then be allowed to stand for a sufficient period to bring about substantially complete sedimentation or settling of the precipitated magnesium silicate, or, if desired, the precipitated magnesium silicate may be removed by filtration.

The amount of magnesium-bearing reagent used may be varied so as to remove any desired portion or substantially all of the dissolved silica. In order to remove substantially all of the dissolved silica, it is preferred to use an amount of such reagent containing slightly less magnesia than would be required to combine with all of the dissolved silica to form $MgSiO_3$. However, if desired, an excess of the reagent over the above stated amount may be used, but the amount used should not, in any case, materially exceed that which will combine with the silica to form a precipitate, since if an excess over this amount is added a small amount of magnesium compound may go into solution and subsequently cause contamination of the product recovered from the brine.

I prefer to carry out the precipitation and separation of the magnesium silicate at a temperature of approximately 140 to 155° F., since at these temperatures substantially complete precipitation may be effected in a period of from less than one hour to a few hours, but higher or much lower temperatures may be used if desired. For instance, in case it is desired to precipitate dissolved silica from large bodies of alkaline brine in outdoor vats or the like, the precipitation may be carried out at atmospheric temperature and the separation of the magnesium silicate precipitate or sludge may be effected by sedimentation at atmospheric temperature. At the usual summer temperatures, for example from 75 to 100° F., substantially complete sedimentation may ordinarily be obtained in about three to five days.

The following is a specific example of a preferred method of carrying out this invention:

One-thousand-one-hundred-and-thirty-three (1,133) pounds of ground burned dolomite containing 26.30% MgO, 39.21% CaO and 8.18% $CO_2$ were mixed with 1800 gallons of bicarbonate waste liquors containing sodium bicarbonate for 20 minutes and then allowed to settle for twelve hours. After settling the waste liquor was decanted. Substantially all of the calcium in the dolomite was converted into calcium carbonate by the treatment with the bicarbonate waste liquor. Approximately 1500 gallons of water were added to the partially carbonated dolomite and, after mixing, the slurry was pumped to a carbonating tower where it was carbonated with flue gas containing carbon dioxide until all of the magnesia had been converted to carbonate and a small amount of it into bicarbonate. The slurry was then run into a mixing tank and 400 pounds more of dry ground burned dolomite were added together with enough water to make a total volume of 1,740 gallons. Each gallon of slurry then contained 0.227 pound of MgO. Enough carbon dioxide had been absorbed to convert all of the calcium to calcium carbonate and 88% of the magnesium to magnesium carbonate.

The reagent thus prepared consisted of a slurry containing hydrated partially carbonated magnesium hydroxide, probably largely in the form of basic magnesium carbonate, together with calcium carbonate. One-hundred-sixty-five-point-five (165.5) gallons of this slurry were then mixed with 5,485 gallons of alkaline Owens Lake brine containing 0.121% of dissolved silica, at a temperature of 154° F. and the brine agitated for 20 minutes at about this temperature. One and one-half hours after adding the dolomite slurry the brine was filtered through a Sweetland filter. The filtered brine contained 0.016% silica. Subsequently the brine was carbonated and a yield of substantially silica-free sesquicarbonate of soda was obtained from it. After the removal of the soda, the brine was cooled and a substantially silica-free yield of borax was obtained from it.

I claim:

1. The method of removing dissolved silica from alkaline brine which comprises thoroughly mixing with such a brine a reagent comprising magnesium carbonate in finely divided hydrated form, allowing the mixture to react, at a temperature of approximately 140 to 155° F., for a sufficient time to cause formation of a crystalline precipitate of magnesium silicate, and separating said precipitate from the brine.

2. The method of removing dissolved silica from alkaline brine which comprises mixing with such a brine a reagent comprising a mixture of calcium carbonate and partially carbonated magnesium hydroxide, allowing the mixture to react for a sufficient time to cause formation of a crystalline precipitate of magnesium silicate, and separating said precipitate from the brine.

3. In a method of removing dissolved silica from an alkaline brine, the steps which comprise mixing with such a brine a reagent comprising hydrated, at least partially carbonated, magnesia in an amount slightly less than that required to combine with all the dissolved silica to form $MgSiO_3$, and allowing the mixture to react to form a crystalline precipitate of magnesium silicate.

4. In a method of removing dissolved silica from an alkaline brine, the steps which comprise hydrating calcined dolomite, carbonating the hydrated material, in aqueous suspension, to a sufficient extent to completely carbonate the calcium and partially carbonate the magnesium, mixing the resulting slurry with an alkaline brine containing dissolved silica, and allowing the mixture to react to form a crystalline precipitate of dissolved silica.

WALTER A. KUHNERT.